United States Patent

Sugimoto

(10) Patent No.: US 8,179,450 B2
(45) Date of Patent: May 15, 2012

(54) ELECTRONIC CAMERA

(75) Inventor: Hiroshi Sugimoto, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 322 days.

(21) Appl. No.: 12/576,947

(22) Filed: Oct. 9, 2009

(65) Prior Publication Data

US 2010/0091130 A1 Apr. 15, 2010

(30) Foreign Application Priority Data

Oct. 14, 2008 (JP) .................................. 2008-265586

(51) Int. Cl.
*H04N 5/228* (2006.01)
*H04N 5/222* (2006.01)
*H04N 5/232* (2006.01)
*G06K 9/00* (2006.01)
*G06K 9/46* (2006.01)
*G06K 9/62* (2006.01)

(52) U.S. Cl. ........... 348/222.1; 348/333.03; 348/333.12; 348/345; 382/118; 382/165; 382/181; 382/190; 382/209

(58) Field of Classification Search ................ 348/222.1, 348/333.03, 333.12, 345; 382/180, 118, 382/103, 195, 190, 191, 165, 181, 206, 209
See application file for complete search history.

(56) References Cited

U.S. PATENT DOCUMENTS

| 2005/0231628 A1* | 10/2005 | Kawaguchi et al. .......... 348/345 |
| 2007/0211161 A1* | 9/2007 | Okamoto .................. 348/333.12 |
| 2009/0141937 A1* | 6/2009 | Abe .............................. 382/103 |
| 2010/0165113 A1* | 7/2010 | Abe .............................. 348/169 |

FOREIGN PATENT DOCUMENTS

| JP | 4-281578 A | 10/1992 |
| JP | 8-153197 A | 6/1996 |
| JP | 10-274516 A | 10/1998 |
| JP | 10-307923 A | 11/1998 |
| JP | 11-281661 A | 10/1999 |
| JP | 2000-97676 A | 4/2000 |
| JP | 2000-339476 | * 12/2000 |
| JP | 2000-339476 A | 12/2000 |
| JP | 2005-318554 A | 11/2005 |
| JP | 2007-259423 A | 10/2007 |

* cited by examiner

*Primary Examiner* — Lin Ye
*Assistant Examiner* — Marly Camargo
(74) *Attorney, Agent, or Firm* — Westerman, Hattori, Daniels & Adrian, LLP

(57) ABSTRACT

An electronic camera includes an imager. The imager, having an imaging surface capturing an object scene, outputs an object scene image. A CPU searches a face portion of a person from the object scene based on the object scene image outputted from the imager. Moreover, the CPU sets to the imaging surface a cross area having a shape different depending on each attitude of the discovered face portion, in a manner to correspond to the discovered face portion. The CPU refers to an image of the cross area thus set so as to adjust imaging parameters such as a focus and an exposure amount.

7 Claims, 15 Drawing Sheets

DIC

| FACE SET (FS_1) || FACE SET (FS_2) ||
|---|---|---|---|
| FACE PATTERN (FP_1) | CROSS AREA (CRS_1) | FACE PATTERN (FP_2) | CROSS AREA (CRS_2) |
|  |  |  |  |
| FACE SET (FS_3) || FACE SET (FS_4) ||
| FACE PATTERN (FP_3) | CROSS AREA (CRS_3) | FACE PATTERN (FP_4) | CROSS AREA (CRS_4) |
|  |  |  |  |
| FACE SET (FS_5) || FACE SET (FS_6) ||
| FACE PATTERN (FP_5) | CROSS AREA (CRS_5) | FACE PATTERN (FP_6) | CROSS AREA (CRS_6) |
|  |  |  |  |
| ⋮ || ⋮ ||

FIG.4
(A) FD_1　　　　　(B) FD_2　　　　　(C) FD_3
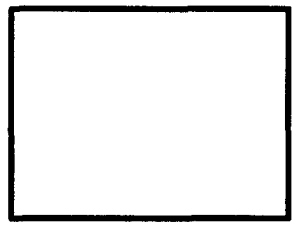  
(D) FD_4　　　　　(E) FD_5　　　　　(F) FD_6
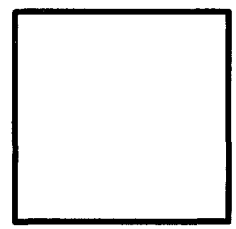  
FIG.5
TBL1-TBL3
| No. | POSITION OF FACE IMAGE | SHAPE OF CROSS AREA |
|---|---|---|
| 1 | | |
| 2 | | |
| 3 | | |
| ⋮ | ⋮ | ⋮ |

(A) FACE RECOGNITION: SUCCEEDED

FD_1

(B) DEFINITION OF CROSS AREA AND ADJUSTMENT AREA

CRS_1    ADJ (A) FACE RECOGNITION: SUCCEEDED

FD_4

(B) DEFINITION OF CROSS AREA AND ADJUSTMENT AREA

CRS_6   ADJ (A) FACE RECOGNITION: FAILED (B) REDEFINITION OF CROSS AREA AND ADJUSTMENT AREA

ELECTRONIC CAMERA

CROSS REFERENCE OF RELATED APPLICATION

The disclosure of Japanese Patent Application No. 2008-265586, which was filed on Oct. 14, 2008, is incorporated herein by reference.

BACKGROUND OF THE INVENTION

1. Field of the Invention

The present invention relates to an electronic camera. More particularly, the present invention relates to an electronic camera which notices a predetermined object appearing in an object scene so as to adjust an imaging parameter.

2. Description of the Related Art

According to one example of this type of a camera, a plurality of face determining regions respectively having a plurality of sizes different to one another are prepared. These face determining regions move on an imaging surface in a raster scanning direction in order to detect a face image from an object scene image. When a partial image belonging to the face determining region is determined as a face image, a size and a position of the face determining region at this time point is written as face information. Imaging parameters such as a focus and an exposure amount are adjusted by referring to the face position information thus written.

However, in the above-described camera, a shape of the face determining region is fixed, and thus, a subject other than the face enters the face determining region. This may decrease the accuracy for adjusting the imaging parameters.

SUMMARY OF THE INVENTION

An electronic camera according to the present invention, comprises: an imager, having an imaging surface capturing an object scene, which outputs an object scene image; a searcher which searches a predetermined object from the object scene based on the object scene image outputted from the imager; a setter which sets to the imaging surface an object area having a shape different depending on each attitude of the object discovered by the searcher, in a manner to correspond to the object discovered by the searcher; and an adjuster which adjusts an imaging parameter by referring to an image of the object area set by the setter.

Preferably, further comprised is a holder which holds a plurality of referred images respectively corresponding to a plurality of attitudes different to one another and a plurality of object areas respectively corresponding to the plurality of referred images, wherein the searcher and the setter respectively execute an object searching process and an area setting process in reference to the holder.

Preferably, the object searching process includes a checking process in which a specific referred image that satisfies a predetermined matching condition is determined by checking each of the plurality of referred images held by the holder with a partial image on the object scene image outputted from the imager, and the area setting process includes an area specifying process in which an object area corresponding to the specific referred image is specified based on the plurality of object areas held by the holder and a defining process for defining on the specific referred image the object area specified by the area specifying process.

More preferably, the imager, the searcher, and the setter repeatedly execute an image outputting process, an object searching process, and an area setting process, respectively, and the electronic camera, further comprising a re-setter which re-sets the object area by referring to a variation history of the object area set by the area setting process when a result of the object searching process indicates a loss of the object.

Preferably, the predetermined object is equivalent to a face portion of a person.

An imaging controlling program product according to the present invention is an imaging controlling program product executed by a processor of an electronic camera provided with an imager, having an imaging surface capturing an object scene, which outputs an object scene image, the imaging controlling program product comprising: a searching step of searching a predetermined object from the object scene based on the object scene image outputted from the imager; a setting step of setting to the imaging surface an object area having a shape different depending on each attitude of the object discovered in the searching step, in a manner to correspond to the object discovered in the searching step; and an adjusting step of adjusting an imaging parameter by referring to an image of the object area set in the setting step.

An imaging control method according to the present invention is an imaging control method executed by an electronic camera provided with an imager, having an imaging surface capturing an object scene, which outputs an object scene image, the image control method, comprising: a searching step of searching a predetermined object from the object scene based on the object scene image outputted from the imager; a setting step of setting to the imaging surface an object area having a shape different depending on each attitude of the object discovered in the searching step, in a manner to correspond to the object discovered in the searching step; and an adjusting step of adjusting an imaging parameter by referring to an image of the object area set in the setting step.

The above described features and advantages of the present invention will become more apparent from the following detailed description of the embodiment when taken in conjunction with the accompanying drawings.

BRIEF DESCRIPTION OF THE DRAWINGS

FIG. 4(A) is an illustrative view showing one example of a face-detection frame structure;

FIG. 4(B) is an illustrative view showing another example of the face-detection frame structure;

FIG. 4(C) is an illustrative view showing still another example of the face-detection frame structure;

FIG. 4(D) is an illustrative view showing yet still another example of the face-detection frame structure;

FIG. 4(E) is an illustrative view showing another example of the face-detection frame structure;

FIG. 4(F) is an illustrative view showing still another example of the face-detection frame structure;

FIG. 5 is an illustrative view showing one example of a table referred to in the embodiment in FIG. 1;

DETAILED DESCRIPTION OF THE PREFERRED EMBODIMENTS

Figure 1:
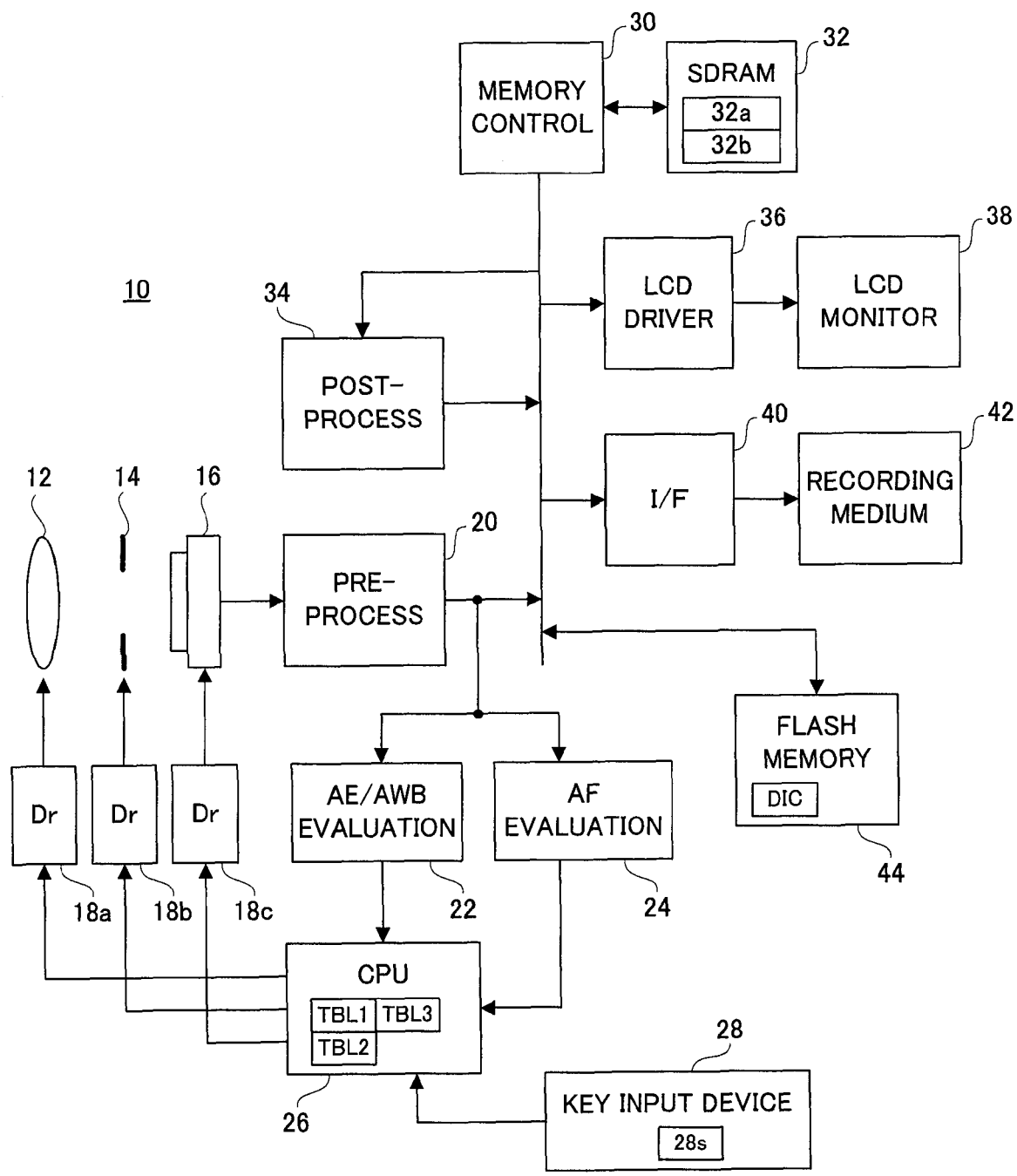
FIG. 1 is a block diagram showing a configuration of one embodiment of the present invention.

With reference to FIG. 1, a digital camera 10 according to this embodiment includes a focus lens 12 and an aperture unit 14 respectively driven by drivers 18a and 18b. An optical image of an object scene that undergoes these components is irradiated onto an imaging surface of an imager 16, and subjected to a photoelectric conversion. Thereby, electric charges representing an object scene image are produced.

When power is inputted, in order to start a through-image process under an imaging task, a CPU 26 commands a driver 18c to repeat an exposure operation and a thinning-out reading-out operation. The driver 18c, in response to a vertical synchronization signal Vsync periodically generated from an SG (Signal Generator) not shown, exposes the imaging surface, and reads out one portion of the electric charges produced on the imaging surface in a raster scanning manner. From the imager 16, a low-resolution raw image signal that is based on the read-out electric charges is periodically outputted.

A pre-processing circuit 20 performs processes such as a CDS (Correlated Double Sampling), AGC (Automatic Gain Control), and an A/D conversion, on the raw image signal outputted from the imager 16, and outputs raw image data as a digital signal. The outputted image data is written in a raw image area 32a of an SDRAM 32 through a memory control circuit 30.

A post-processing circuit 34 reads out the raw image data accommodated in the raw image area 32a through the memory control circuit 30, and performs processes such as a white balance adjustment, a color separation, and a YUV conversion, on the read-out raw image data, so as to create YUV-formatted image data. The created image data is written into a YUV image area 32b of the SDRAM 32 through the memory control circuit 30.

An LCD driver 36 repeatedly reads out the image data accommodated in the YUV image area 32b through the memory control circuit 30, and drives an LCD monitor 38 based on the read-out image data. As a result, a real-time moving image (through image) of the object scene is displayed on a monitor screen.

Figure 2:
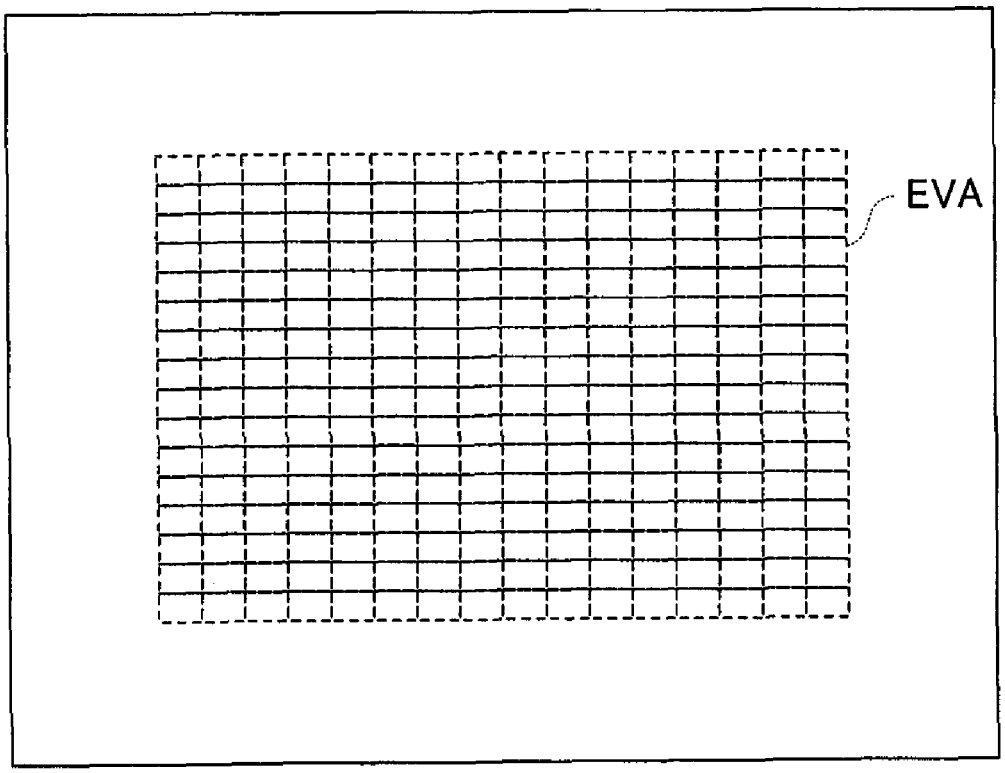
FIG. 2 is an illustrative view showing one example of a state that an evaluation area is allocated to an imaging surface.

With reference to FIG. 2, an evaluation area EVA is allocated to a center of the imaging surface. The evaluation area EVA is divided into 16 portions in each of a horizontal direction and a vertical direction, and therefore, 256 divided areas form the evaluation area EVA. Moreover, in addition to the above-described processes, the pre-processing circuit 20 executes a simple RGB converting process for simply converting the raw image data into RGB data.

An AE/AWB evaluating circuit 22 integrates RGB data belonging to the evaluation area EVA, out of the RGB data produced by the pre-processing circuit 20, at each generation of the vertical synchronization signal Vsync. Thereby, 256 integral values, i.e., 256 AE/AWB evaluation values, are outputted from the AE/AWB evaluating circuit 22 in response to the vertical synchronization signal Vsync.

Moreover, an AF evaluating circuit 24 extracts a high-frequency component of G data belonging to the same evaluation area EVA, out of the RGB data outputted from the pre-processing circuit 20, and integrates the extracted high-frequency component at each generation of the vertical synchronization signal Vsync. Thereby, 256 integral values, i.e., 256 AF evaluation values, are outputted from the AF evaluating circuit 24 in response to the vertical synchronization signal Vsync.

The CPU 26 executes a through image-use AE/AWB process that is based on the output from the AE/AWB evaluating circuit 22, in parallel with the through-image process, so as to calculate an appropriate EV value and an appropriate white-balance adjustment gain. An aperture amount and an exposure time period that define the calculated appropriate EV value are set to the drivers 18b and 18c, respectively. Moreover, the calculated appropriate white-balance adjustment gain is set to the post-processing circuit 34. As a result, a brightness and a white balance of the through image are adjusted moderately.

Furthermore, the CPU 26 executes an AF process that is based on the output from the AF evaluating circuit 24, under a continuous AF task in parallel with the through-image process. The focus lens 12 is moved continuously in an optical-axis direction by the driver 18a so as to follow a focal point. Thereby, a focus of the through image is moderately adjusted.

When a shutter button 28s is half-depressed, the CPU 26 interrupts the continuous AF task, and executes a recording-use AF process under the imaging task Also the recording-use AF process is executed based on the output of the AF evaluating circuit 24. Thereby, the focus is adjusted strictly. Thereafter, the CPU 26 executes a recording-use AE process based on the output of the AE/AWB evaluating circuit 22 so as to calculate an optimal EV value. Similar to the case described above, an aperture amount and an exposure time period that define the calculated optimal EV value are set to the drivers 18b and 18c, respectively. As a result, the brightness of the through image is adjusted strictly.

When the shutter button 28s is fully depressed, the CPU 26 commands the driver 18c to execute an exposure operation and an all-pixel reading operation once each in order to start a recording process, and furthermore, the CPU 26 starts up an I/F 40. The driver 18c exposes the imaging surface in response to the vertical synchronization signal Vsync, and reads out all of the electric charges produced thereby from the imaging surface in a raster scanning manner. From the imager 16, a 1-frame raw image signal having a high resolution is outputted.

The raw image signal outputted from the imager 16 is converted into raw image data by the pre-processing circuit 20, and the converted raw image data is written in the raw image area 32a of the SDRAM 32 by the memory control circuit 30. The CPU 26 calculates an optimal white-balance adjustment gain based on the raw image data accommodated in the raw image area 32a, and sets the calculated optimal white-balance adjustment gain to the post-processing circuit 34.

The post-processing circuit 34 reads out the raw image data accommodated in the raw image area 32a through the memory control circuit 30, converts the read-out raw image data into YUV-formatted image data having the optimal white balance, and writes the converted image data, through the memory control circuit 30, in the YUV image area 32b of the SDRAM 32. The I/F 40 reads out the image data thus accommodated in the YUV image area 32b through the memory control circuit 30, and records the read-out image data in a recording medium 42 in a file format.

It is noted that the through-image process is resumed at a time point at which the YUV-formatted image data having a high resolution is secured in the YUV image area 32b. Also the continuous AF task is re-started up at this time point.

The CPU 26 repeatedly searches the face image of a person from the low-resolution raw image data accommodated in the raw image area 32a of the SDRAM 32, under a face detecting task executed in parallel with the through-image process. For such a face detecting task, a dictionary DIC shown in FIG. 3, six face-detection frame structures FD_1 to FD_6 shown in FIG. 4(A) to FIG. 4(F), and three tables TBL1 to TBL3 shown in FIG. 5 are prepared.

Figure 3:
FIG. 3 is an illustrative view showing one example of a dictionary referred to in the embodiment in FIG. 1.
Figure 3:
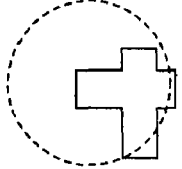
Figure 3:
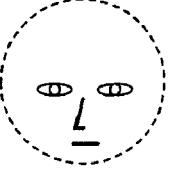
Figure 3:
Figure 3:
Figure 3:
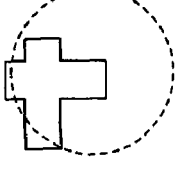
Figure 3:
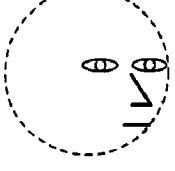
Figure 3:
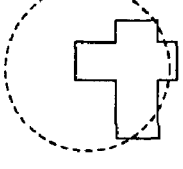
Figure 3:
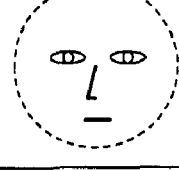
Figure 3:
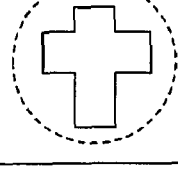
Figure 3:
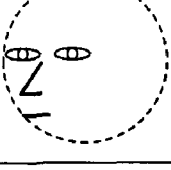
Figure 3:
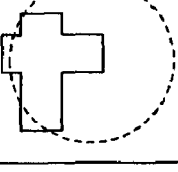

According to FIG. 3, a plurality of face sets FS_1, FS_2, . . . are registered in the dictionary DIC. To each of the face sets FS_L (L:1, 2, . . . ), a face pattern FP_L and a cross area CRS_L corresponding to each other are allocated. A horizontal bar of the cross area CRS_L is formed in a manner to cover both eyes on the face pattern FP_L, and a vertical bar of the cross area CRS_L is formed in a manner to cover a forehead, a nose, and a mouth on the face pattern FP_L.

Moreover, according to FIG. 4(A) to FIG. 4(F), the face-detection frame structures FD_1 to FD_6 have shapes and/or sizes different to one another. More specifically, the face-detection frame structures FD_1 to FD_3 have shapes the same to one another and sizes different to one another. On the other hand, unlike the face-detection frame structures FD_1 to FD_3, the face-detection frame structures FD_4 to FD_6 have shapes the same as one another and sizes different to one another.

Furthermore, each of tables TBL1 to TBL3 shown in FIG. 5 is equivalent to a table used for writing the face information thereon, and is formed by a column in which a position of the face image is written and a column in which a shape of the cross area that matches the face image is written. It is noted that the shape of the cross area is expressed by two sizes in a vertical direction and two sizes in a horizontal direction (intersection of the cross is regarded as a base point), coordinates of the intersection of the cross, and widths of the horizontal bar and the vertical bar.

In the face detecting task, firstly, the table TBL1 is designated as a current frame table on which the face information of a current frame is held. However, the designated table is cyclically updated among the tables TBL1 and TBL3 for each frame. In a subsequent frame, the current frame table is a prior frame table. Upon completion of designation of the current frame table, a variable K is set to "1", and a face-detection frame structure corresponding to a value of the set variable K is set to an upper left of the evaluation area EVA shown in FIG. 6, i.e., a face-detection starting position.

When the vertical synchronization signal Vsync is generated, out of the current-frame raw image data accommodated in the raw image area 32a of the SDRAM 32, partial image data belonging to the face-detection frame structure is checked with each of the plurality of face patterns FP_1, FP_2, . . . written in the dictionary DIC shown in FIG. 3. When it is determined that the partial image to be noticed matches any one of the face patterns, a cross area corresponding to the matched face pattern is read out from the dictionary DIC and a position of the face-detection frame structure at a current time point (i.e., a position of the face image) and a shape of the read-out cross area are written, as the face information, on the current frame table.

Figure 6:
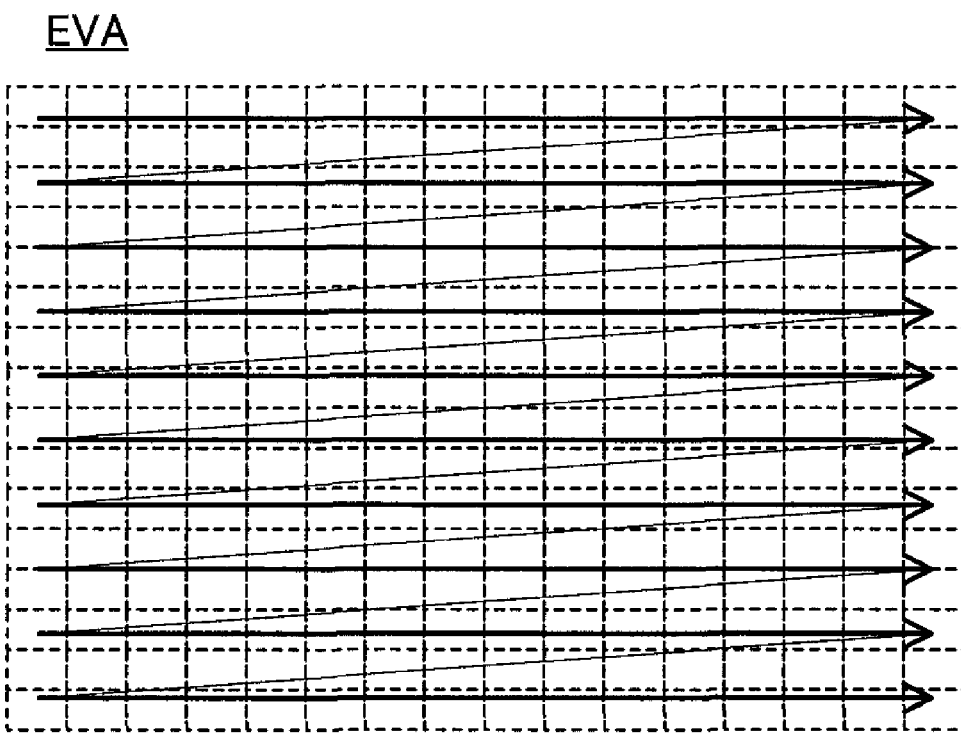
FIG. 6 is an illustrative view showing one portion of a face detecting operation.

The face-detection frame structure is moved by each pre-determined amount in a raster direction according to a manner shown in FIG. 6, and subjected to the checking process as described above at a plurality of positions on the evaluation area EVA. Then, at each discovery of the face image of a person, the face information corresponding to the discovered face image (i.e., the position of the face image and shape of the cross area) are being written on the current frame table.

When the face-detection frame structure to be noticed reaches a lower right of the evaluation area EVA, i.e., a face-detection ending position, the variable K is updated, and a face-detection frame structure corresponding to a value of the updated variable K is re-placed at the face-detection starting position. Similarly to the above-described case, the face-detection frame structure is moved in a raster direction on the evaluation area EVA, and the face information corresponding to the face image detected by the checking process is written on the current frame table. Such a face recognizing process is repeatedly executed until a face-detection frame structure of K=6 reaches the face-detection ending position.

Figure 7:
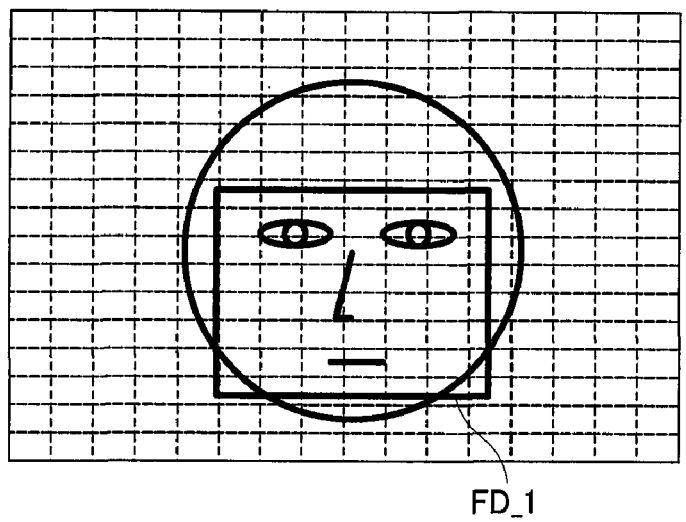
FIG. 7(A) is an illustrative view showing one example of a state that a face recognition is succeeded.
FIG. 7(B) is an illustrative view showing one example of a state that a cross area and an adjustment area are defined on a recognized face image.
Figure 7:
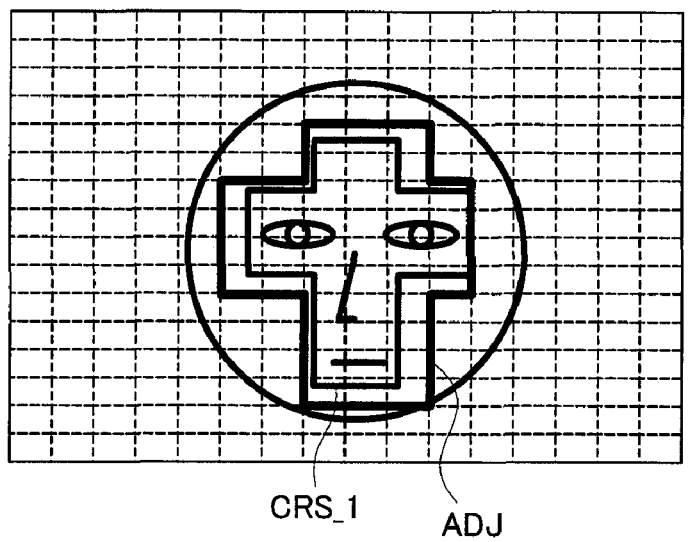

As a result, when the face image of a person exists on the evaluation area EVA according to a manner shown in FIG. 7(A), the checking process is succeeded corresponding to the face-detection frame structure FD_1 shown in the same FIG. 7(A), and a current position of the face-detection frame structure FD_1 and a shape of a cross area CRS_1 shown in FIG. 7(B) are registered, as the face information, on the current frame table.

Figure 8:
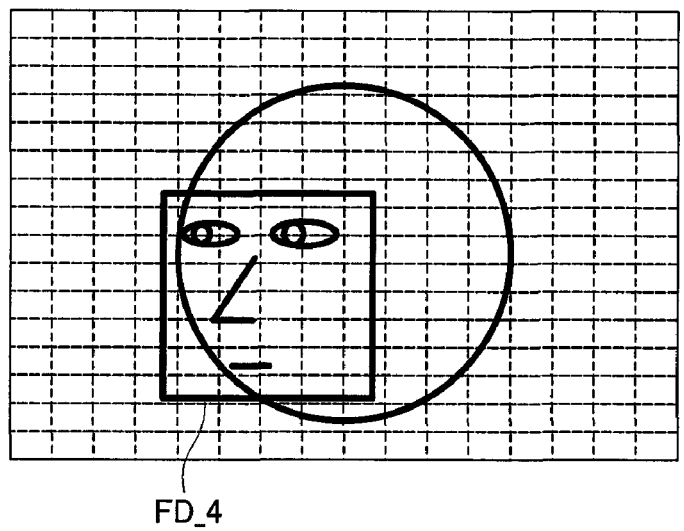
FIG. 8(A) is an illustrative view showing another example of the state that a face recognition is succeeded.
FIG. 8(B) is an illustrative view showing another example of the state that a cross area and an adjustment area are defined on a recognized face image.
Figure 8:
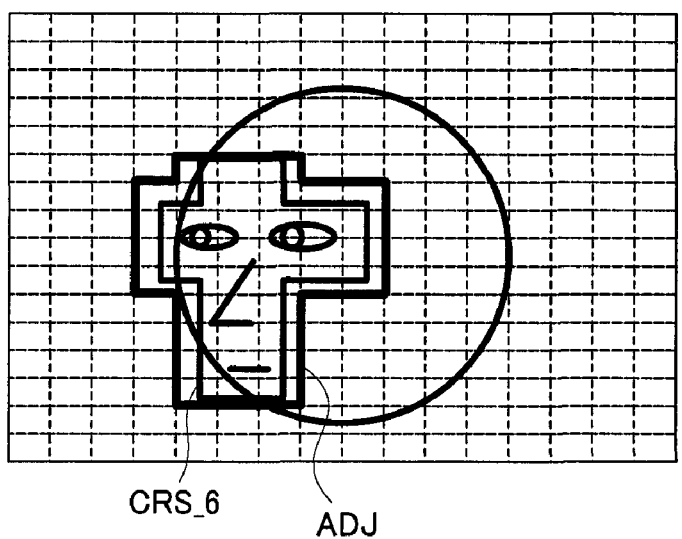

Moreover, when an orientation of the face of a person is changed as shown in FIG. 8(A), the checking process is succeeded in a manner to correspond to the face-detection frame structure FD_4 shown in the same FIG. 8(A). On the current frame table, a current position of the face-detection frame structure FD_4 and a shape of a cross area CRS_6 shown in FIG. 8(B) are registered, as the face information, on the current frame table.

Figure 9:
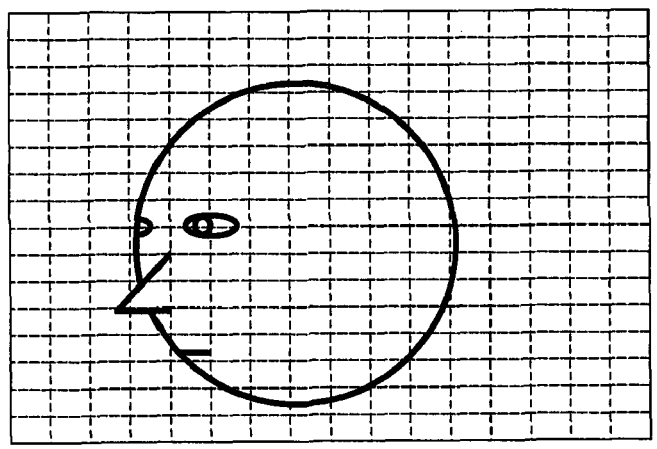
FIG. 9(A) is an illustrative view showing one example of a state that a face recognition is failed.
FIG. 9(B) is an illustrative view showing one example of a state that a cross area and an adjustment area are defined on an unrecognized face image.
Figure 9:
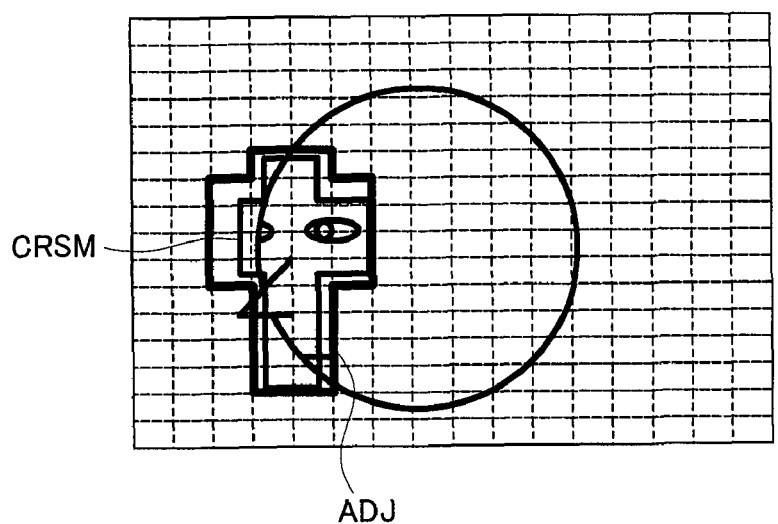

When the orientation of the face of a person is changed as shown in FIG. 7(A)→FIG. 8(A)→FIG. 9(A), there is a possibility that the face image that is detectable in the prior frame is not detectable in the current frame, and as a result, the face information existing on the prior frame table is missing on the current frame table (designated table). In consideration of such a possibility, a re-defining process for the face information, described below, is executed.

Firstly, the face information written on the designated table is compared with the face information written on the prior frame table so as to determine whether or not the face information is missing. When a determination result is affirmative, the number of missing cross areas is set to a constant Mmax and a variable M is set to "1".

Subsequently, face information of past two frames corresponding to an M-th cross area is detected, as a variation history of the face image, from the prior frame table and a table of two frames before. A position of an M-th face image and a shape of the M-th cross area are compensated by referring to the detected face information, and the position of the face image and the shape of the cross area compensated are written, as the face information, on the designated table.

Therefore, when the recognition of the face image shown in FIG. 9(A) is failed, a cross area CRSM shown in FIG. 9(B) is compensated based on the position and the shape of the cross area of past two frames.

When M-th face information is written on the designated table, the variable M is incremented, and whether or not the incremented variable M is equal to the constant Mmax is determined. When the variable M is equal to or less than the constant Mmax, another missing cross area is noticed and the above-described processes are executed again. On the other hand, when the variable M exceeds the constant Mmax, the re-defining process for the face information is ended.

Upon ending of the re-defining process for the face information, the designated table is updated and the updated designated table is initialized. Moreover, the variable K is set to "1". A face recognizing process of a subsequent frame is started in response to the generation of the vertical synchronization signal Vsync.

In parallel with such a face detecting task, the CPU 40 defines a position and a shape of an adjustment area ADJ referred to for the AE/AWB process and the AF process, under an adjustment-area controlling task. In the adjustment-area controlling task, the prior frame table on which the face information is finalized is noticed. When the face information is written on the prior frame table, one portion of the divided areas covering the cross area expressed by this face information is defined as the adjustment area ADJ. On the other hand, when no face information is written on the prior frame table, the whole evaluation area EVA is defined as the adjustment area ADJ.

Therefore, when the cross area CRS_1 is defined according to a manner shown in FIG. 7(B), the adjustment area ADJ is defined according to a manner shown in the same FIG. 7(B). Moreover, when the cross area CRS_6 is defined according to a manner shown in FIG. 8(B), the adjustment area ADJ is defined according to a manner shown in the same FIG. 8(B). Furthermore, when the cross area CRSM is defined according to a manner shown in FIG. 9(B), the adjustment area ADJ is defined according to a manner shown in the same FIG. 9(B).

The above-described through image-use AE/AWB process and recording-use AE/AWB process are executed based on the AE/AWB evaluation values belonging to the adjustment area ADJ defined by the adjustment-area controlling task, out of the 256 AE/AWB evaluation values outputted from the AE/AWB evaluating circuit 22. Moreover, also the through image-use AF process and recording-use AF process are executed based on the AF evaluation values belonging to the adjustment area ADJ defined by the adjustment-area controlling task, out of the 256 AF evaluation values outputted from the AF evaluating circuit 24. Thereby, the accuracy for adjusting the imaging parameters such as an exposure amount and a focus is improved.

It is noted that the face detecting task and the adjustment-area controlling task are stopped in response to the half-depression of the shutter button 28s, and is re-started up in response to the ending of the recording process responding to the full-depression of the shutter button 28s or the cancellation of the manipulation of the shutter button 28s.

Figure 10:
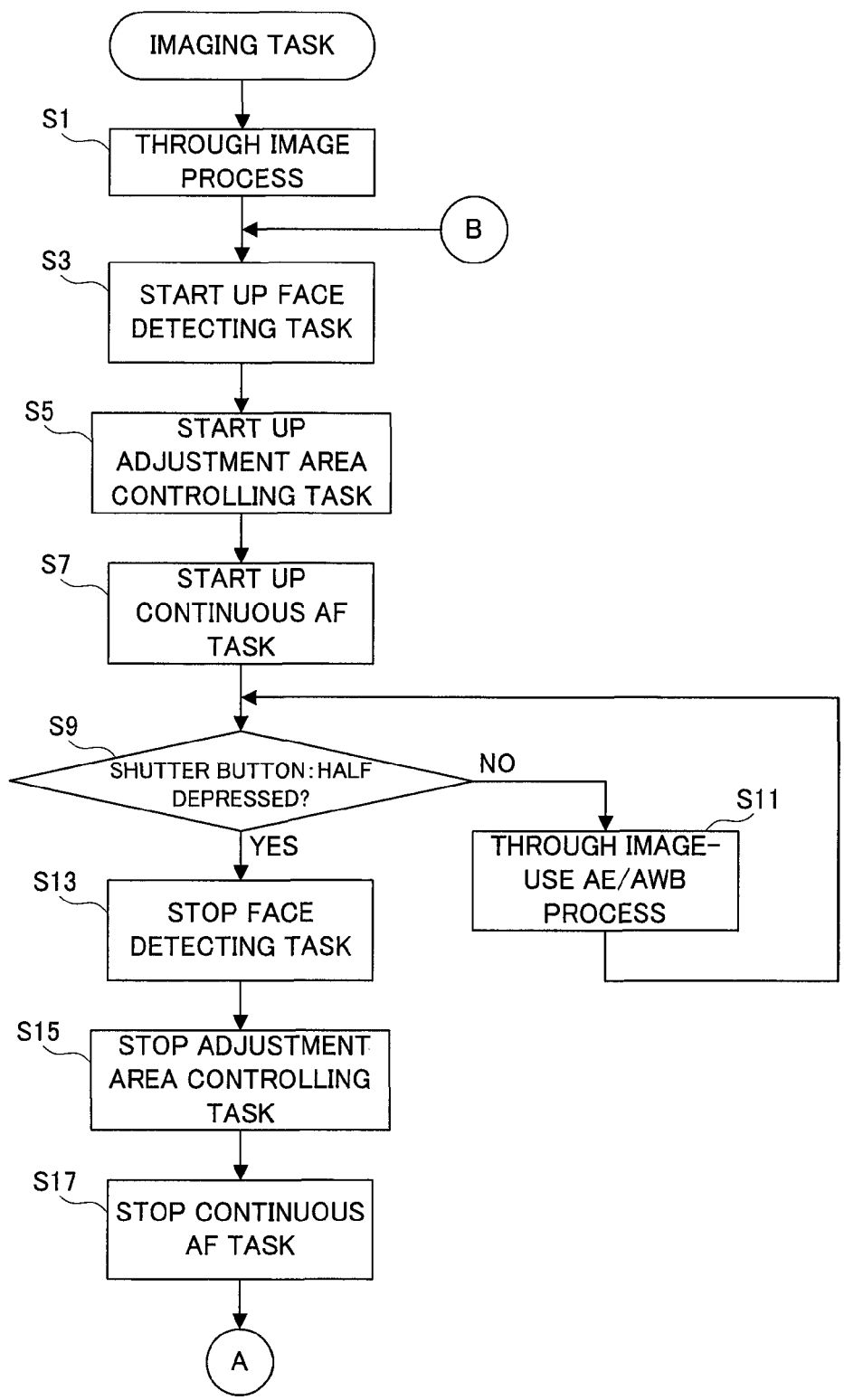
FIG. 10 is a flowchart showing one portion of an operation of a CPU applied to the embodiment in FIG. 1.
Figure 11:
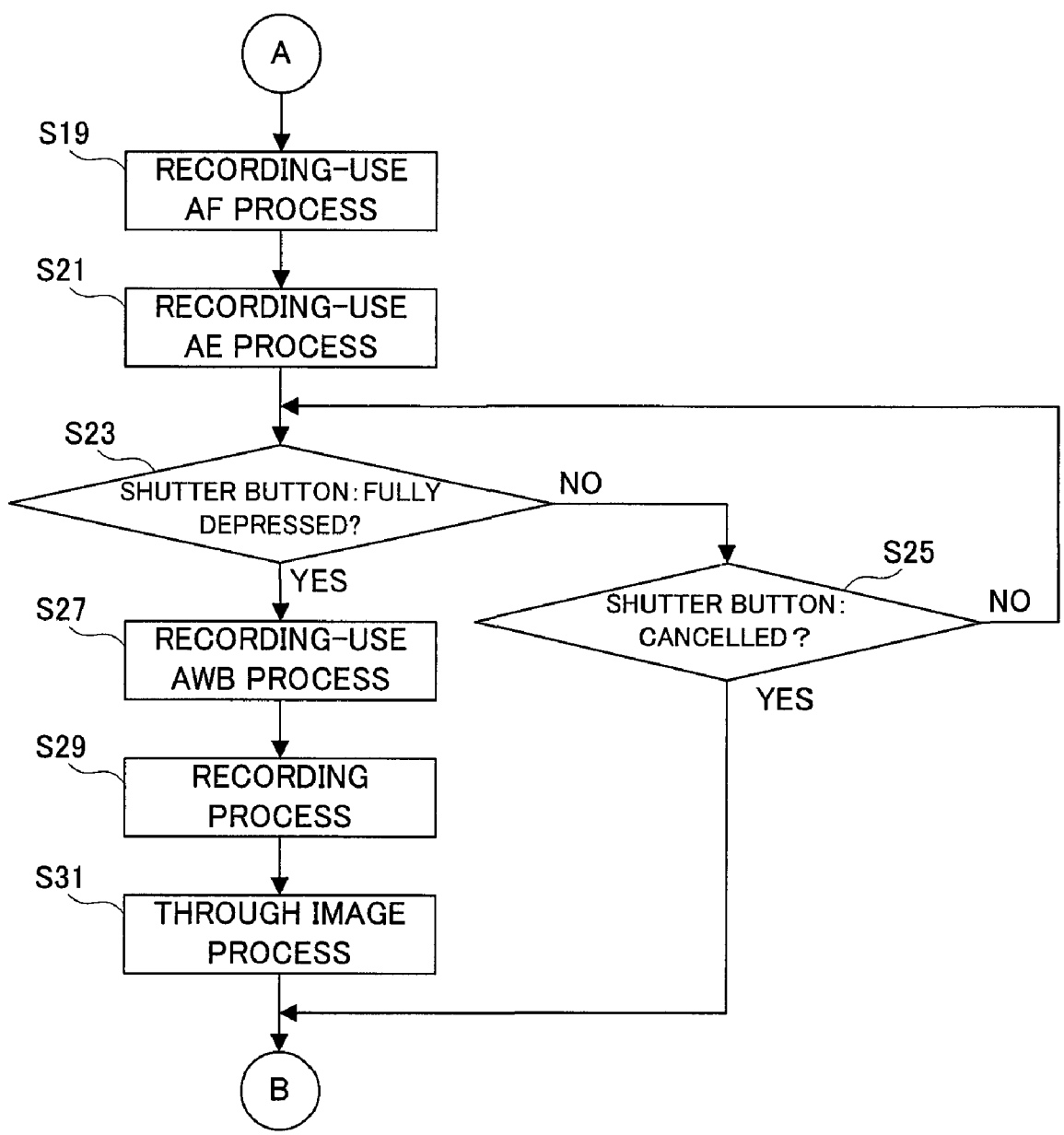
FIG. 11 is a flowchart showing another portion of the operation of the CPU applied to the embodiment in FIG. 1.
Figure 16:
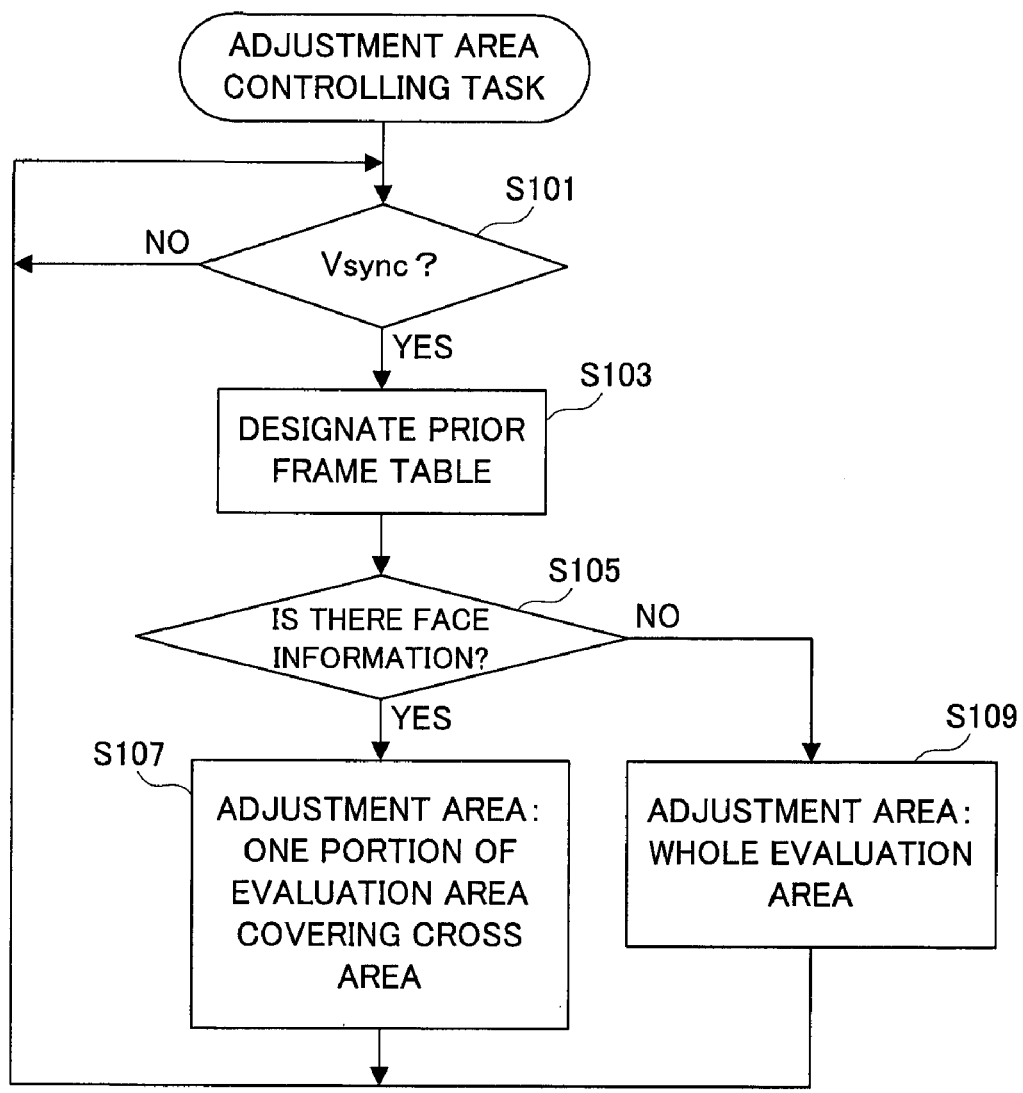
FIG. 16 is a flowchart showing yet still another portion of the operation of the CPU applied to the embodiment in FIG. 1.

The CPU 26 executes in a parallel manner a plurality of tasks including an imaging task shown in FIG. 10 and FIG. 11, a face detecting task shown in FIG. 12 to FIG. 15, and an adjustment-area controlling task shown in FIG. 16. It is noted that control programs corresponding to these tasks are stored in a flash memory 44.

With reference to FIG. 10, the through-image process is executed in a step S1. As a result, the through image representing the object scene is displayed on the LCD monitor 38. In a step S3, the face detecting task is started, in a step S5, the adjustment-area controlling task is started up, and in a step S7, the continuous AF task is started. In a step S9, whether or not the shutter button 28s is half-depressed is determined, and as long as NO is determined, the through image-use AE/AWB process performed in a step S11 is repeated.

As a result of starting up of the continuous AF task, a focus of the through image is moderately adjusted. Moreover, as a result of the through image-use AE/AWB process, a brightness and a white balance of the through image are moderately adjusted.

When YES is determined in the step S9, the face detecting task is stopped in a step S13. In a step S15, the adjustment-area controlling task is stopped, and in a step S17, the continuous AF task is stopped. In a step S19, the recording-use AF process is executed, and in a step S21, the recording-use AE process is executed. By the recording-use AF process, the focus of the through image is strictly adjusted, and by the recording-use AE process, the brightness of the through image is strictly adjusted.

In a step S23, whether or not the shutter button 28s is fully depressed is determined, and in a step S25, whether or not the manipulation of the shutter button 28s is cancelled is determined. When YES is determined in the step S23, the process advances to a step S27, and when YES is determined in the step S25, the process returns to the step S3. In the step S27, the recording-use AWB process is executed, and in a step S29, the recording process is executed. Thereby, a high-resolution object scene image having the optimal white balance is recorded in the recording medium 42. In a step S31, the through-image process is resumed, and thereafter, the process returns to the step S3.

Figure 12:
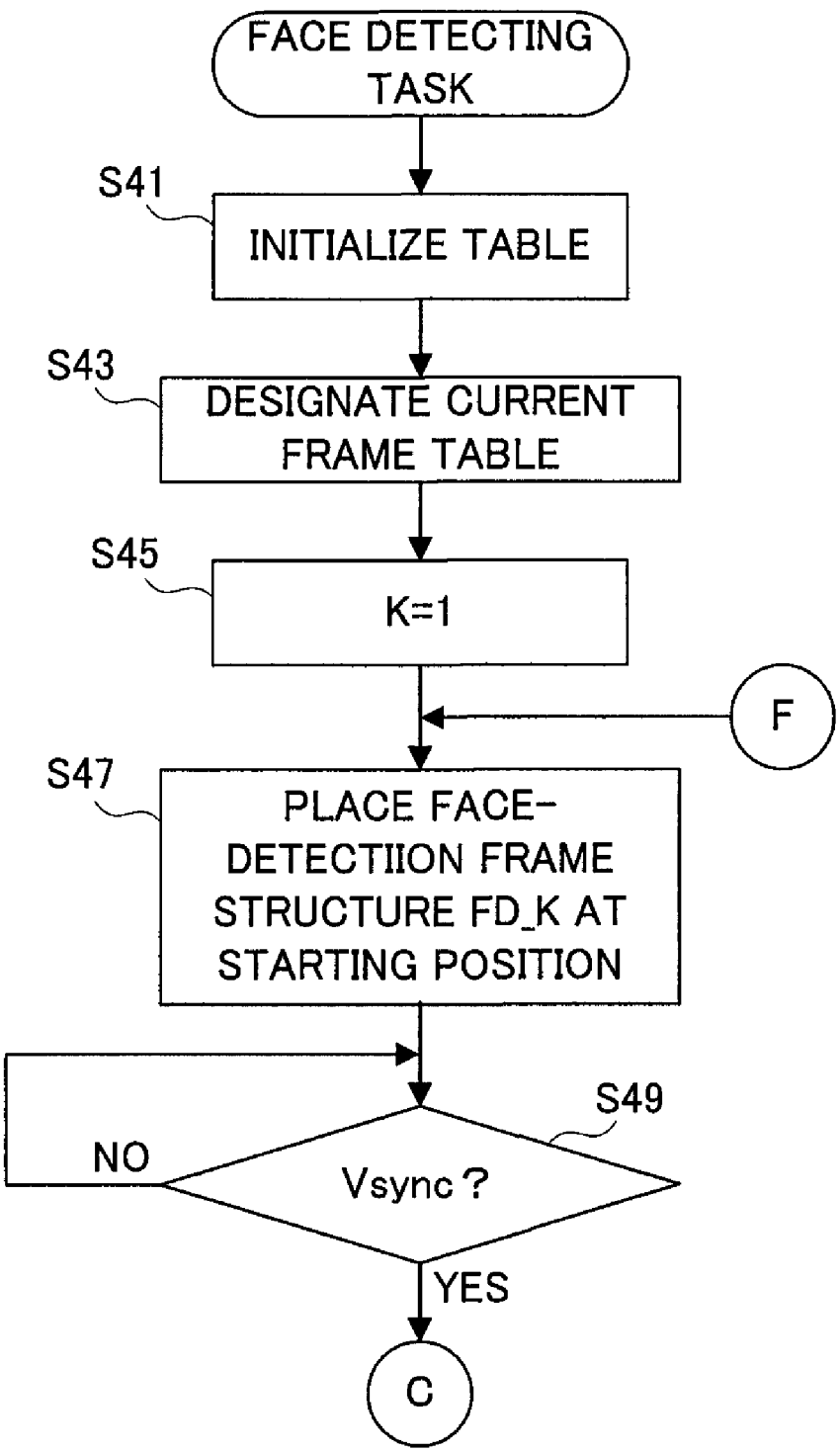
FIG. 12 is a flowchart showing still another portion of the operation of the CPU applied to the embodiment in FIG. 1.
Figure 13:
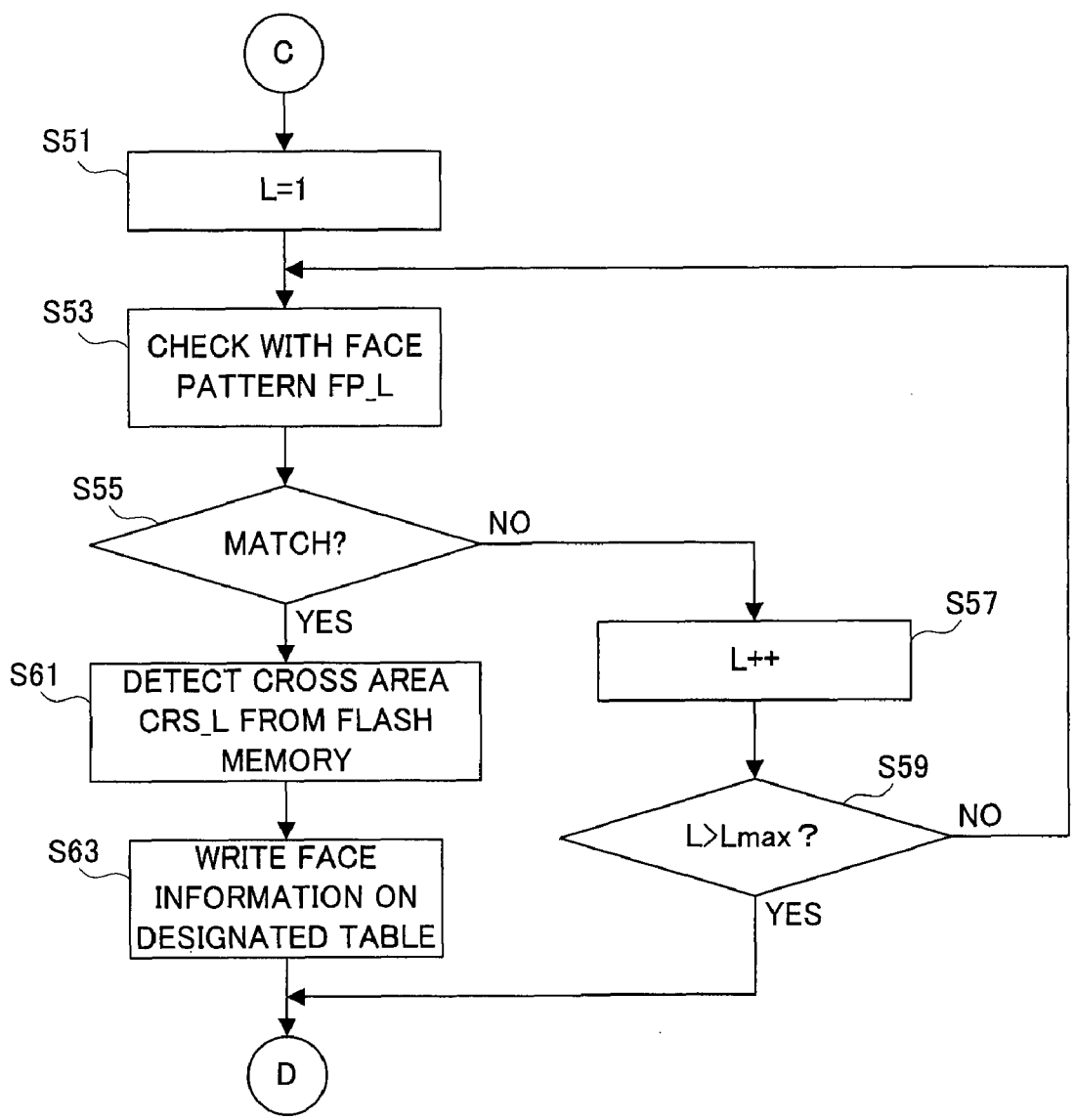
FIG. 13 is a flowchart showing yet still another portion of the operation of the CPU applied to the embodiment in FIG. 1.
Figure 14:
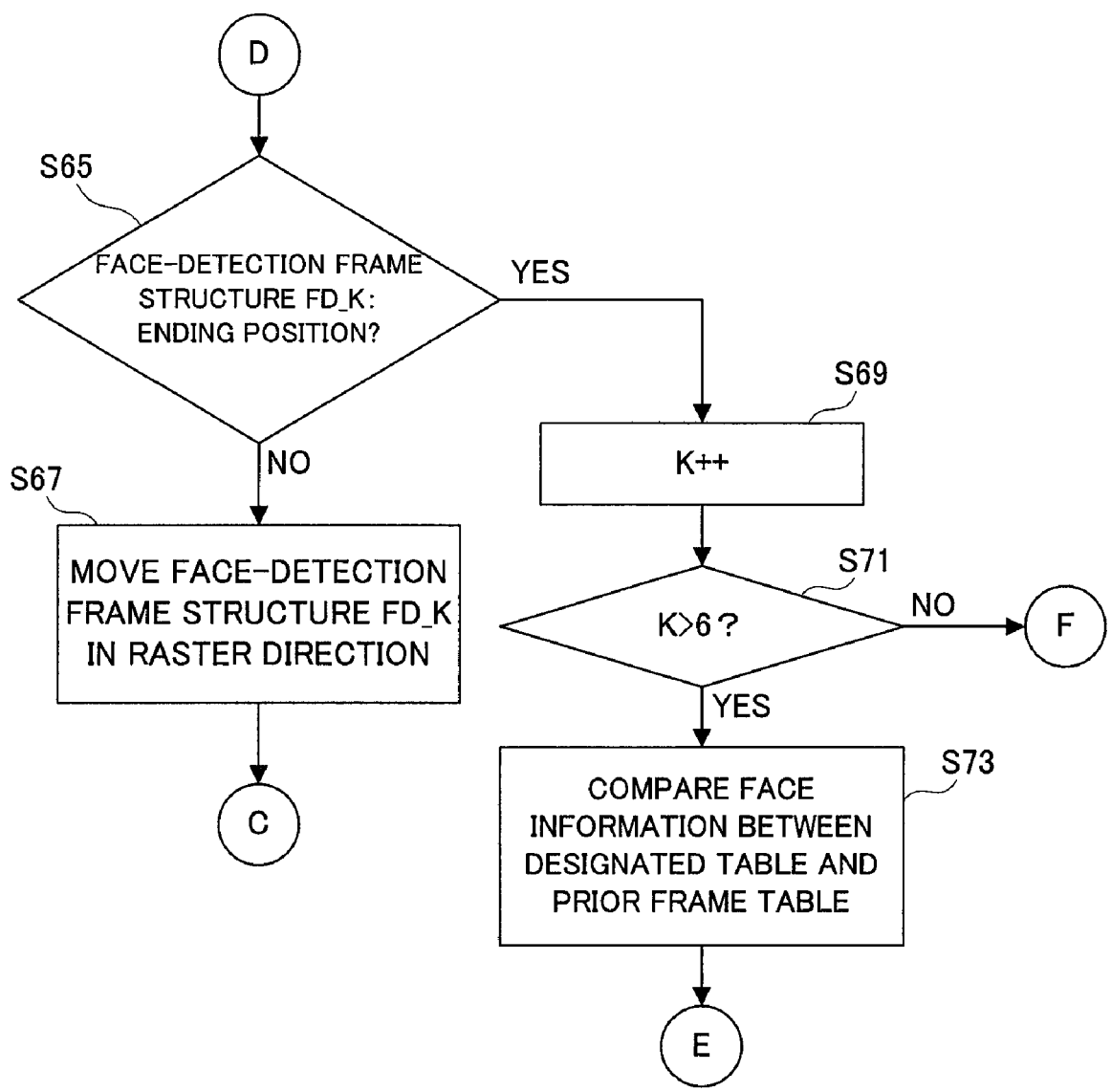
FIG. 14 is a flowchart showing another portion of the operation of the CPU applied to the embodiment in FIG. 1.
Figure 15:
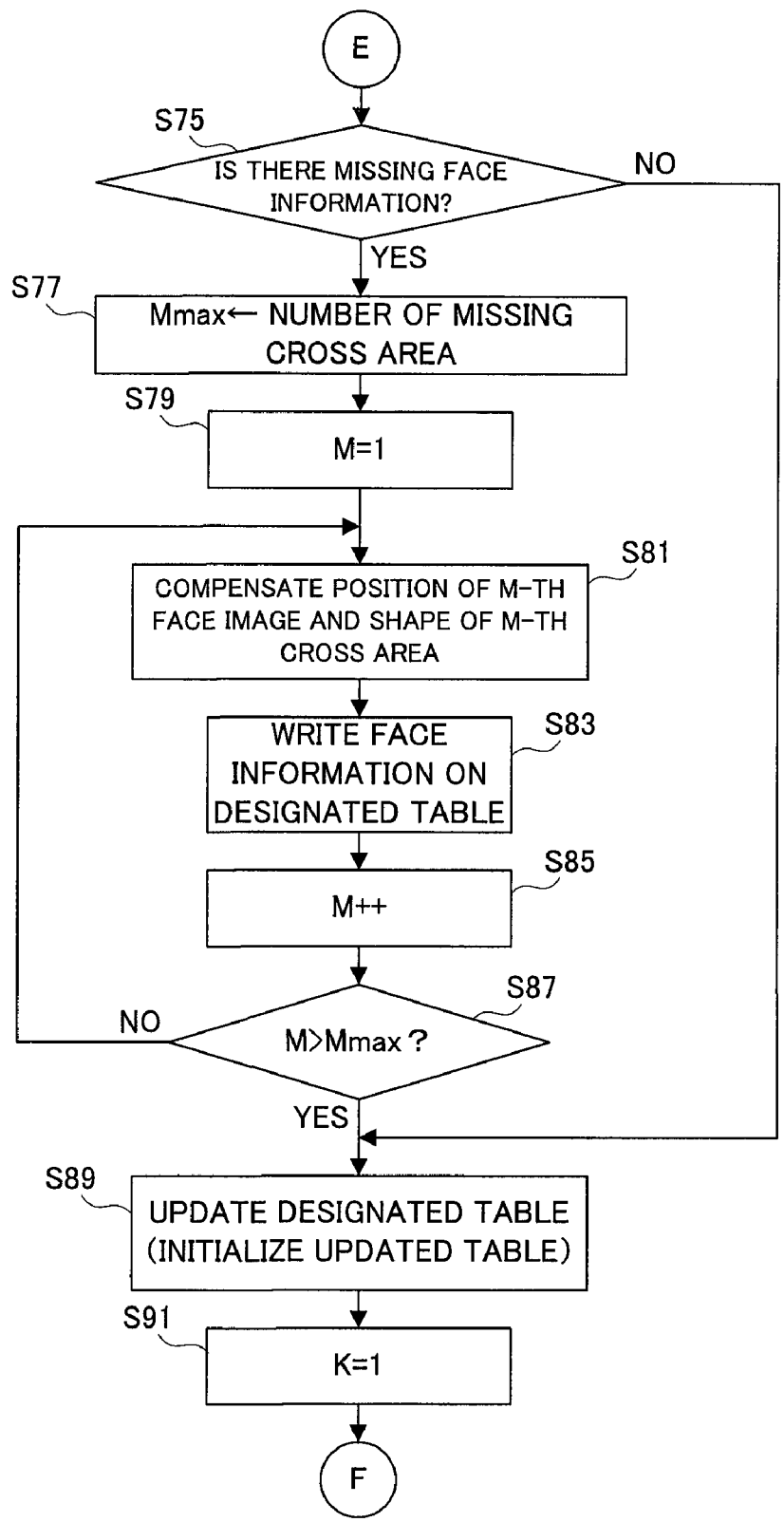
FIG. 15 is a flowchart showing still another portion of the operation of the CPU applied to the embodiment in FIG. 1.

With reference to FIG. 12, in a step S41, the tables TBL1 to TBL3 are initialized, and in a step S43, the table TBL1 is designated as the current frame table. In a step S45, the variable K is set to "1", and in a step S45, a face-detection frame structure FD_K is placed at the face-detection starting position at an upper left of the evaluation area EVA.

It is noted that the current frame table is cyclically updated among the tables TBL1 to TBL3 by a process in a step S89 described later. Therefore, in a subsequent frame, the current frame table is the prior frame table.

In a step S49, whether or not the vertical synchronization signal Vsync is generated is determined, and when a determination result is updated from NO to YES, a variable L is set to "1" in a step S51. In a step S53, the partial image belonging to the face-detection frame structure FD_K is checked with the face pattern FP_L registered in the dictionary DIC, and in a step S55, whether or not the partial image of the face-detection frame structure FD_K matches the face pattern FP_L is determined.

When NO is determined in this step, the variable L is incremented in a step S57, and whether or not the incremented variable L exceeds the constant Lmax equivalent to a total number of the face patterns registered in the dictionary DIC is determined in a step S59. Then, when L≦max is established, the process returns to the step S53 while when L>Lmax is established, the process advances to a step S65.

When YES is determined in the step S55, the process advances to a step S61 so as to read out the cross area CRS_L corresponding to the face pattern FP_L from the dictionary DIC. In a step S63, the position of the current face-detection frame structure FD_K and the shape of the read-out cross area CRS_L are written, as the face information, on the designated table, and thereafter, the process advances to the step S65.

In the step S65, whether or not the face-detection frame structure FD_K reaches the face-detection ending position at a lower right of the evaluation area EVA is determined. When NO is determined in this step, the face-detection frame structure FD_K is moved in a raster direction by a predetermined amount in a step S67, and thereafter, the process returns to the step S51. On the other hand, when YES is determined in the step S65, the variable K is incremented in a step S69, and whether or not the incremented variable K exceeds "6" is determined in a step S71. Then, when K≦6 is established, the process returns to the step S47 while when K>6 is established, the process advances to a step S73.

In the step S73, the face information written on the designated table (current frame table) is compared with the face information written on the prior frame table. In a step S75, whether or not the face information that is written on the prior frame table but missing on the designated table exists is determined based on a comparison result in the step S73. When NO is determined in this step, the process directly advances to the step S89 while when YES is determined, the process advances to the step S89 after undergoing the processes from steps S77 to S87.

In the step S77, the number of cross areas missing on the designated table is set to the constant Mmax, and in the step S79, the variable M is set to "1". In the step S81, the position of the M-th face image and the shape of the M-th cross area are compensated by referring to the face information missing on the designated table, out of the face information written on the table of the past two frames.

In the step S83, the compensated face information is written on the designated table, and in the step S85, the variable M is incremented. In the step S87, whether or not the incremented variable M exceeds the constant Mmax is determined, and when M≦Mmax is established, the process returns to the step S81 while M>Mmax is established, the process advances to the step S89.

In the step S89, the designated table is updated and the updated designated table is initialized. Upon completion of the process in the step S89, the variable K is set to "1" in a step S91, and thereafter, the process returns to the step S47.

With reference to FIG. 16, in a step S101, whether or not the vertical synchronization signal Vsync is generated is determined, and when a determination result is updated from NO to YES, the prior frame table is designated in a step S103. In a step S105, whether or not the face information, i.e., the cross area, is written on the prior frame table is determined, and when YES is determined, the process advances to a step S107 while when NO is determined, the process advances to a step S109.

In the step S107, one portion of the divided areas covering the cross area written on the designated table, out of the 256 divided areas forming the evaluation area EVA, is defined as the adjustment area ADJ. In the step S109, the whole evaluation area EVA is defined as the adjustment area ADJ. Upon completion of the process in the step S107 or S109, the process returns to the step S101.

As is seen from the above description, the imager 16, having the imaging surface capturing the object scene, outputs the object scene image. The CPU 26 searches the face portion of a person from the object scene based on the object scene image outputted from the imager 16 (S45 to S59, and S65 to S71). Also, the CPU 26 sets to the imaging surface the cross area having a shape different depending on each attitude of the discovered face portion, in a manner to correspond to the discovered face portion (S61 and S63). The CPU 26 refers to the image of the cross area thus set so as to adjust the imaging parameters such as a focus and an exposure amount (S107, S7, S11, S19, S21, and S27).

Thus, the shape of the cross area set to the imaging surface corresponding to the face portion of a person is differed depending on each attitude of the face portion of a person. In other words, when the attitude of the face portion of a person is changed, the shape of the cross area is also changed. Thereby, a degree by which the cross area corresponds to an object different from the face portion of a person is inhibited, and thus, the improvement of the accuracy for adjusting the imaging parameters is realized.

It is noted that in this embodiment, the face pattern that matches the partial image belonging to the face-detection frame structure is detected from among a plurality of face patterns contained in the dictionary DIC. However, it may be optionally possible that the matching degree relative to the partial image belonging to the face-detection frame structure is calculated corresponding to each of the plurality of face patterns and an interpolating process is performed on a plurality of face patterns in which the matching degree exceeds a reference, thereby producing a face pattern having a higher matching degree. In this case, the shape of the cross area is also corrected by the interpolating process for the plurality of cross areas respectively corresponding to the plurality of face patterns in which the matching degree exceeds the reference.

Moreover, in this embodiment, the face portion of a person is assumed as a predetermined object. However, a face portion of an animal such as a dog and cat may be optionally assumed instead thereof. Furthermore, in this embodiment, 3 frames of face information is managed by the three tables TBL1 to TBL3. In addition, when the number of tables is increased, it becomes possible to comprehend by the table the variation history of the face information over a longer time period, thereby improving a capability of compensating the missing face information. Furthermore, in this embodiment, a so-called digital still camera which records a still image is assumed. However, the present invention is applicable also to a digital video camera which records a moving image.

Moreover, in this embodiment, the area covering the face portion of a person is formed in a cross shape. However, the shape of the area covering the face portion of a person may be optionally formed in a T-lettered shape or an elliptical shape.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
an imager, which outputs electronic image representing a scene captured on an imaging surface;
a searcher which searches for a predetermined object from the scene based on the electronic image outputted from said imager;
a setter which sets to said imaging surface an object area having a shape different depending on an attitude of the object discovered by said searcher, in a manner to correspond to the object discovered by said searcher; and
an adjuster which adjusts an imaging parameter by referring to an image in the object area set by said setter.

2. An electronic camera according to claim 1, further comprising a holder which holds a plurality of referred images respectively corresponding to a plurality of attitudes different from one another and a plurality of object areas respectively corresponding to said plurality of referred images, wherein said searcher and said setter respectively execute an object searching process and an area setting process in reference to said holder.

3. An electronic camera according to claim 2, wherein said object searching process includes a checking process in which a specific referred image that satisfies a predetermined matching condition is determined by checking each of the plurality of referred images held by said holder with a partial image on the electronic image outputted from said imager, and said area setting process includes an area specifying process in which an object area corresponding to said specific referred image is specified based on the plurality of object areas held by said holder and a defining process for defining on said specific referred image the object area specified by said area specifying process.

4. An electronic camera according to claim 1, wherein said imager, said searcher, and said setter repeatedly execute an image outputting process, an object searching process, and an area setting process, respectively, and said electronic camera, further comprising a re-setter which re-sets said object area by referring to a variation history of the object area set by said area setting process when a result of said object searching process indicates a loss of said object.

5. An electronic camera according to claim 1, wherein said predetermined object is equivalent to a face portion of a person.

6. An imaging controlling program recorded in a non-transitory recording medium when executed by a processor of an electronic camera provided with an imager which outputs an electronic image representing a scene captured on an imaging surface, causes the electronic camera to perform the following steps:

a searching step of searching for a predetermined object from the scene based on the electronic image outputted from said imager;

a setting step of setting to said imaging surface an object area having a shape different depending on an attitude of the object discovered in said searching step, in a manner to correspond to the object discovered in said searching step; and an adjusting step of adjusting an imaging parameter by referring to an image in the object area set in said setting step.

7. An imaging control method executed by an electronic camera provided with an imager which outputs an electronic image representing a scene captured on an imaging surface, the image control method, comprising:

a searching step of searching for a predetermined object from the scene based on the electronic image outputted from said imager;

a setting step of setting to said imaging surface an object area having a shape different depending on an attitude of the object discovered in said searching step, in a manner to correspond to the object discovered in said searching step; and an adjusting step of adjusting an imaging parameter by referring to an image of the object area set in said setting step.

\* \* \* \* \*